(12) United States Patent
Hendriks et al.

(10) Patent No.: US 12,539,380 B2
(45) Date of Patent: Feb. 3, 2026

(54) DIGITAL TWIN OF LUNG THAT IS CALIBRATED AND UPDATED WITH MECHANICAL VENTILATOR DATA AND BED-SIDE IMAGING INFORMATION FOR SAFE MECHANICAL VENTILATION

(71) Applicant: KONINKLIJKE PHILIPS N.V., Eindhoven (NL)

(72) Inventors: Cornelis Petrus Hendriks, Eindhoven (NL); Roberto Buizza, Eindhoven (NL); Rita Priori, Eindhoven (NL); Michael Polkey, Monroeville, PA (US); Joerg Sabczynski, Hamburg (DE); Rafael Wiemker, Hamburg (DE); Jaap Roger Haartsen, Eindhoven (NL); Thomas Koehler, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 856 days.

(21) Appl. No.: 17/879,054

(22) Filed: Aug. 2, 2022

(65) Prior Publication Data

US 2023/0102865 A1 Mar. 30, 2023

Related U.S. Application Data

(60) Provisional application No. 63/250,253, filed on Sep. 30, 2021.

(51) Int. Cl.
*A61M 16/00* (2006.01)
*A61B 5/00* (2006.01)
(Continued)

(52) U.S. Cl.
CPC ...... *A61M 16/026* (2017.08); *A61M 16/0003* (2014.02); *A61M 2016/0018* (2013.01);
(Continued)

(58) Field of Classification Search
CPC ............ A61M 16/026; A61M 16/0003; A61M 2016/0018; A61M 2016/0027;
(Continued)

(56) References Cited

U.S. PATENT DOCUMENTS

2015/0290418 A1 10/2015 Kaczka
2020/0303080 A1 9/2020 Dubois
(Continued)

OTHER PUBLICATIONS

Roth, C.J. et al., "A comprehensive computational human lung model incorporating inter-acinar dependencies: Application to spontaneous breathing and mechanical ventilation.". (2017) Int. J. Numer. Meth. Biomed. Engng.
(Continued)

*Primary Examiner* — Valerie L Woodward
*Assistant Examiner* — Mautin I Ashimiu
(74) *Attorney, Agent, or Firm* — Daniel H. Brean (57) ABSTRACT

A mechanical ventilation device comprising at least one electronic controller configured to receive imaging data and transpulmonary pressure data associated with a lung of a patient; perform deformable image registration of the inhalation image and the exhalation image to produce a relative compliance or elasticity map of the lungs; convert the relative compliance or elasticity map of the lungs to a quantitative compliance or elasticity map of the lungs based on the inhale transpulmonary pressure and the exhale transpulmonary pressure; and display the information relating to or derived from the quantitative compliance or elasticity map on a display device.

14 Claims, 7 Drawing Sheets

(51) Int. Cl.
   *A61B 5/08*    (2006.01)
   *A61M 16/04*   (2006.01)
   *A61M 16/08*   (2006.01)
   *G16H 20/40*   (2018.01)
   *G16H 30/40*   (2018.01)
   *G16H 50/50*   (2018.01)

(52) U.S. Cl.
   CPC ............ *A61M 2016/0027* (2013.01); *A61M 2016/0033* (2013.01); *A61M 2205/3317* (2013.01); *A61M 2205/3344* (2013.01); *A61M 2205/502* (2013.01); *A61M 2205/584* (2013.01); *A61M 2230/42* (2013.01)

(58) Field of Classification Search
   CPC .. A61M 2016/0033; A61M 2205/3317; A61M 2205/3344; A61M 2205/502; A61M 2205/584; A61M 2230/42; A61M 16/0066; A61M 16/04; A61M 16/08; A61M 2205/505; A61M 2209/084; A61M 16/00; A61M 16/024; A61M 2210/1025; A61M 2210/1039; A61M 2230/46; A61B 5/4833; A61B 5/08–097; A61B 5/0033–004; G16H 50/50; G16H 30/40; G16H 20/40
   See application file for complete search history.

(56) References Cited

U.S. PATENT DOCUMENTS

2021/0345906 A1* 11/2021 Nair .................... G06T 7/62
2022/0040427 A1* 2/2022 Teschner ............. A61M 16/024

OTHER PUBLICATIONS

Andrade, C.I., "Inelastic Deformable Image Registration (i-DIR): Capturing Sliding Motion through Automatic Detection of Discontinuities", Mathematics 2021, 9,97.

Galban, C.J. et al., "Computed tomography-based biomarker provides unique signature for diagnosis of COPD phenotypes and disease progression", Nature Medicine 18(11), 1711.

Bodduluri, S., "CT image registration-based lung mechanics in COPD", PhD (Doctor of Philosophy) thesis, University of Iowa, 2016.

Guerrero, T. et al., "Novel method to calculate pulmonary compliance images in rodents from computed tomography acquired at constant pressures", Phys. Med. Biol. 51 (2006) 1101-1112.

Umbrello, M. et al., 2018, "Interpretation of the transpulmonary pressure in the critically ill patient", Ann Transl. Med 2018;6(19):383.

Ibrahim, I.B.M., 2016, "Transient Mechanical Response of Lung Airway Tissue during Mechanical Ventilation", Bioengineering 2016, 3, 4.

International Search Report for PCT/EP2022/07499 filed Sep. 7, 2022.

Roth, C.J. et al., "Coupling of EIT with computational lung modeling for predicting patient-specific ventilatory responses". Journal of Applied Physiology, vol. 122, No. 4, (2017), pp. 855-867.

Nieman, G.F. et al., "Personalizing mechanical ventilation according to physiologic parameters to stabilize alveoli and minimize ventilator induced lung injury (VILI)". Intensive Care Medicine Experimental, Biomed Central Ltd., London, UK, vol. 5, No. 1 (2017), pp. 1-21.

* cited by examiner

DIGITAL TWIN OF LUNG THAT IS CALIBRATED AND UPDATED WITH MECHANICAL VENTILATOR DATA AND BED-SIDE IMAGING INFORMATION FOR SAFE MECHANICAL VENTILATION

CROSS-REFERENCE TO RELATED APPLICATIONS

This patent application claims the priority benefit under 35 U.S.C. § 119(e) of U.S. Provisional Application No. 63/250,253, filed on Sep. 30, 2021, the contents of which are herein incorporated by reference.

The following relates generally to the respiratory therapy arts, respiratory stress and strain arts, Ventilator Induced Lung Injury (VILI) arts, and related arts.

BACKGROUND

During mechanical ventilation therapy of a patient, clinicians decide which volume of air a mechanical ventilator is supposed to provide to the patient based on body size of the patient. This volume needs to provide sufficient aeration without causing damage to the lung due to stress (barotrauma), strain (volutrauma), or shear due to cyclic opening and collapse of the alveoli (atelectrauma). This type of lung damage due to the stresses and strains imposed by the mechanical ventilator is known as Ventilator Induced Lung Injury (VILI).

A problem in determining the mechanical ventilator settings for preventing lung damage is that the lung is heterogeneous, either intrinsically due to locally varying structures, geometry, and mechanical properties, or secondary due to local damage or fluid accumulation caused by a disease or infection such as chronic obstructive pulmonary disease (COPD), pneumonia, edema, Covid-19, fibrosis, and so forth. This can lead to local stresses and strains concentrations that are much higher than the apparent global stress and strain, as can be estimated based on the patient's body size, or based on the lumped volume and compliance as measured by sophisticated mechanical ventilators.

In some current approaches, provides a solution for the assessment and prevention of VILI includes constructing a three-dimensional (3D) biophysical model of a patient's lungs based on computed tomography (CT) exhalation imaging information (see, e.g., Roth, J. et al., 2017, "A comprehensive computational human lung model incorporating inter-acinar dependencies: Application to spontaneous breathing and mechanical ventilation", Int. J. Numer. Meth. Biomed. Engng. (2017); e02787). With this model, the clinician can try mechanical ventilator (MV) settings and see via simulation what happens in the lung (e.g., a strain distribution in the parenchymal tissue). The mechanical properties of the lung tissue (i.e., the stiffness of the alveolar ducts and the inter alveoli linkers) are chosen such that the lung model simulates experimental behavior. In this approach, the mechanical properties are not patient specific and not locally varying.

In deformable image registration (DIR), two or more images are geometrically mapped onto each other with the use of a deformation model. It can be applied to find corresponding voxels or regions in two or more medical images (for example, an inhale and an exhale CT of the lung), or to construct a deformation map by showing the relative volume changes of the corresponding tissue elements (i.e., the volumetric strain). A variety of deformation models are available (e.g., rigid, elastic, viscous, sliding surfaces, etc.). As such, DIR can provide a mapping of the regional deformations of the structures and tissues in the lung, which provides useful diagnostic information for the prevention of VILI in critical-care patients. For example, estimates of (volumetric) strain have been correlated with lung inflammation and injury in mechanically ventilated lungs (see, e.g., Andrade, C. I., and Hurtado, D. E., 2021, "Inelastic Deformable Image Registration (i-DIR): Capturing Sliding Motion through Automatic Detection of Discontinuities", Mathematics 2021, 9, 97), and for assessment of COPD (see, e.g., Galban, C., et al., 2012, "Computed tomography-based biomarker provides unique signature for diagnosis of COPD phenotypes and disease progression", Nature Medicine 18(11), 1711; Budduluri, S., 2016, "CT image registration-based lung mechanics In COPD", PhD (Doctor of Philosophy) thesis, University of Iowa, 2016.

In the case of a linear elastic mechanical deformation model, a strain map represents the relative compliance map, provided the force is distributed homogeneously, since in linear elastic mechanical deformation the compliance C is proportional to the strain divided by force, $C \sim e/F$. Correspondingly, the inverse of the compliance map is the stiffness map, since the elastic modulus is $E=1/C$. It is not required to know a corresponding force F. It is required that the force F (mechanical ventilator pressure) is distributed evenly in the lungs, and that there is no resistance (zero flow). That is why in lung compliance mapping with DIR breath hold or pause maneuvers are used. During the maneuver, the plateau pressure is determined.

Construction of a lung compliance map ("pulmonary compliance image") is known for anesthetized and intubated rodents (see, e.g., Guerrero, T. et al., 2006, "Novel method to calculate pulmonary compliance images in rodents from computed tomography acquired at constant pressures", Phys. Med. Biol. 51 (2006) 1101-1112). Such maps are generated to calculate a global lung compliance in a quantitative manner by combining the pulmonary compliance map and the global pressure during a breath-hold provided by the mechanical ventilator, at different pressure levels to measure non-linear tissue response. Furthermore, such processes construct a map of "the mass specific pulmonary compliance", in terms of milliliters (mL) of air per cm H2O per gram of lung tissue.

The following discloses certain improvements to overcome these problems and others.

SUMMARY

In one aspect, a mechanical ventilation device includes at least one electronic controller configured to receive imaging data and transpulmonary pressure data associated with a lung of a patient while the patient undergoes mechanical ventilation therapy with a mechanical ventilator, wherein the imaging data includes an inhalation image acquired during an inhalation phase of the mechanical ventilation therapy; and an exhalation image acquired during an exhalation phase of the mechanical ventilation therapy; and the transpulmonary pressure data includes an inhale transpulmonary pressure at a time of acquisition of the inhalation image; and an inhale transpulmonary pressure at a time of acquisition of the exhalation image; perform deformable image registration of the inhalation image and the exhalation image to produce a relative compliance or elasticity map of the lungs; convert the relative compliance or elasticity map of the lungs to a quantitative compliance or elasticity map of the lungs based on the inhale transpulmonary pressure and the exhale transpulmonary pressure; and display the information relating to or derived from the quantitative compliance or elasticity map on a display device.

In another aspect, a mechanical ventilation method includes, with at least one electronic controller: receiving imaging data and transpulmonary pressure data associated with lungs of a patient while the patient undergoes mechanical ventilation therapy with a mechanical ventilator, wherein the imaging data includes an inhalation image acquired during an inhalation phase of the mechanical ventilation therapy; and an exhalation image acquired during an exhalation phase of the mechanical ventilation therapy; and the transpulmonary pressure data includes an inhale transpulmonary pressure at a time of acquisition of the inhalation image; and an exhale transpulmonary pressure at a time of acquisition of the exhalation image; performing deformable image registration of the inhalation image and the exhalation image to produce a relative compliance or elasticity map of the lungs; converting the relative compliance or elasticity map of the lungs to a quantitative compliance or elasticity map of the lungs based on the inhale transpulmonary pressure and the exhale transpulmonary pressure; and displaying the information relating to or derived from the quantitative compliance or elasticity map on a display device.

One advantage resides in providing a model of the lungs of a patient undergoing mechanical ventilation therapy having mechanical properties with heterogeneous tissue stiffness, patient-specific, and calibrated mechanical properties.

Another advantage resides in providing a model of the lungs of a patient undergoing mechanical ventilation therapy with color-coded tissue map sections corresponding to mechanical properties of the lungs.

Another advantage resides in providing a model of the lungs of a patient undergoing mechanical ventilation therapy on a display device of a mechanical ventilator, thereby reducing the need for an additional computer in an intensive care unit (ICU).

Another advantage resides in providing a model of the lungs of a patient undergoing mechanical ventilation therapy that dynamically updates with additional imaging data of the patient.

Another advantage resides in providing a digital twin of a thoracic cavity of a patient, including the lungs of the patient, undergoing mechanical ventilation therapy that can be used to simulate changes in settings of the mechanical ventilator.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

As used herein, the singular form of "a", "an", and "the" include plural references unless the context clearly dictates otherwise. As used herein, statements that two or more parts or components are "coupled," "connected," or "engaged" shall mean that the parts are joined, operate, or co-act together either directly or indirectly, i.e., through one or more intermediate parts or components, so long as a link occurs. Directional phrases used herein, such as, for example and without limitation, top, bottom, left, right, upper, lower, front, back, and derivatives thereof, relate to the orientation of the elements shown in the drawings and are not limiting upon the scope of the claimed invention unless expressly recited therein. The word "comprising" or "including" does not exclude the presence of elements or steps other than those described herein and/or listed in a claim. In a device comprised of several means, several of these means may be embodied by one and the same item of hardware.

Disclosed herein are systems and methods to support bedside clinicians and care providers in providing safe mechanical ventilation, including guiding clinicians in selecting ventilator settings that will not produce VILI in the specific patient.

Linear or non-linear local lung compliance numbers (relative numbers) are mapped using deformable image registration (DIR) with CT or X-ray. Imaging is triggered or timed at zero flow in the breathing cycle to determine absolute pressures without using breath hold or pause maneuvers. Concurrently with the imaging, transpulmonary pressure readings are acquired. Image calibration is performed with mechanical ventilator data to convert the relative lung compliance into absolute numbers. This uses the transpulmonary pressure values. The output of the process is a quantitative elasticity map.

A digital twin of the patient's thoracic cavity, including the lungs is then generated, i.e., a four-dimensional (4D, space and time dimensions) biophysical lung model including structure, ventilation, and deformation aspects, which is continuously calibrated and updated with mechanical ventilator data and bedside imaging information (e.g., using an imaging modality such as X-ray or ultrasound). The digital twin simulates effects in the lungs at different ventilator settings, in particular tissue stress. Input to the lung model is the quantitative elasticity distribution previously acquired.

Some embodiments further provide a user interface (UI) with an easily read display. The model output is translated in actionable clinical decision support (CDS) information. The user interface (UI) of the mechanical ventilator shows options for the clinician to decide from.

Figure 1:
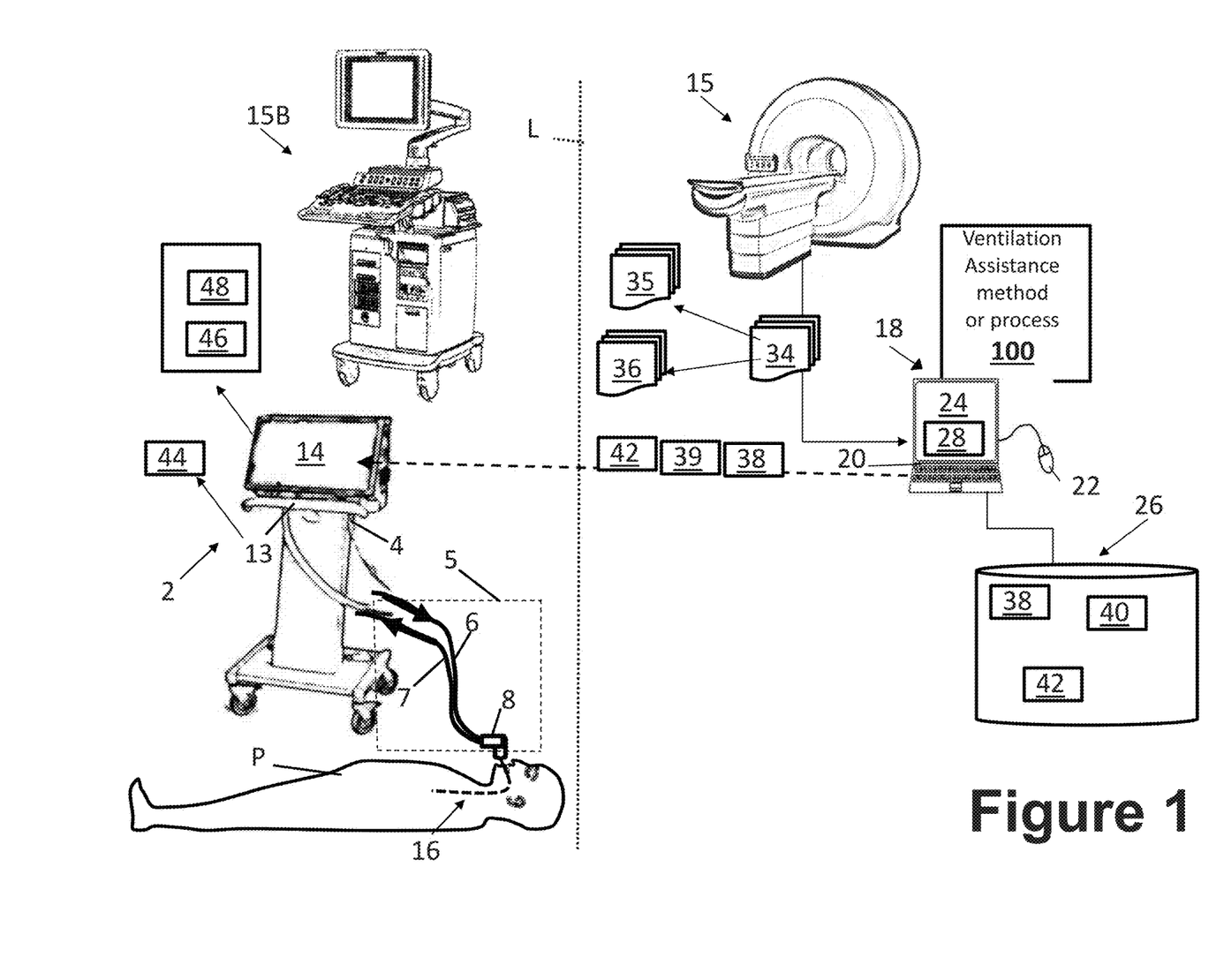
FIG. 1 diagrammatically shows an illustrative mechanical ventilation system in accordance with the present disclosure.

With reference to FIG. 1, a mechanical ventilator 2 for providing ventilation therapy to an associated patient P is shown. As shown in FIG. 1, the mechanical ventilator 2 includes an outlet 4 connectable with a patient breathing circuit 5 to delivery mechanical ventilation to the patient P. The patient breathing circuit 5 includes typical components for a mechanical ventilator, such as an inlet line 6, an optional outlet line 7 (this may be omitted if the ventilator employs a single-limb patient circuit), a connector or port 8 for connecting with an endotracheal tube (ETT), and one or more breathing sensors (not shown), such as a gas flow meter, a pressure sensor, end-tidal carbon dioxide ($etCO_2$)

sensor, and/or so forth. The mechanical ventilator 2 is designed to deliver air, an air-oxygen mixture, or other breathable gas (supply not shown) to the outlet 4 at a programmed pressure and/or flow rate to ventilate the patient via an ETT. The mechanical ventilator 2 also includes an electronic controller (e.g., a microprocessor) 13 for controlling operation of the mechanical ventilator 2, and a display device 14 for displaying information about the patient P and/or settings of the mechanical ventilator 2 during mechanical ventilation of the patient P.

FIG. 1 diagrammatically illustrates the patient P intubated with an ETT 16 (the lower portion of which is inside the patient P and hence is shown in phantom). The connector or port 8 connects with the ETT 16 to operatively connect the mechanical ventilator 2 to deliver breathable air to the patient P via the ETT 16. The mechanical ventilation provided by the mechanical ventilator 2 via the ETT 16 may be therapeutic for a wide range of conditions, such as various types of pulmonary conditions like emphysema or pneumonia, viral or bacterial infections impacting respiration such as a COVID-19 infection or severe influenza, cardiovascular conditions in which the patient P receives breathable gas enriched with oxygen, or so forth.

FIG. 1 also shows a medical imaging device 15 (also referred to as an image acquisition device, imaging device, and so forth). The image acquisition device 15 can be a Computed Tomography (CT) image acquisition device, a C-arm imager, or other X-ray imaging device; Magnetic Resonance (MR) image acquisition device; an ultrasound (US) image acquisition device; or a medical imaging device of another modality. As primarily described herein, the medical imaging device 15 comprises a CT medical imaging device 15. As described herein, the medical imaging device 15 is used to acquire images of the patient P based upon which ETT sizing is performed. It should be noted that the imaging device 15 may not be located in the same room, or even the same department, as the mechanical ventilator 2. For example, the medical imaging device 15 may be located in a radiology laboratory while the mechanical ventilator 2 may be located in an intensive care unit (ICU), cardiac care unit (CCU), in a hospital room assigned to the patient P, or so forth. This is diagrammatically indicated in FIG. 1 by separator line L. Additionally or alternatively, a bedside imaging device 15B, such as an illustrative ultrasound imaging device, may be used.

With continuing reference to FIG. 1, an electronic processing device 18 configured to generate data related to the patient P and/or settings of the mechanical ventilator 2 during mechanical ventilation of the patient P is shown. The electronic processing device 18 can comprise an electronic processing device, such as a workstation computer (more generally, a computer), a smart device (e.g., a smartphone, a tablet, and so forth), or server computer or a plurality of server computers, (e.g., interconnected to form a server cluster, cloud computing resource, or so forth). The electronic processing device 18 includes typical components, such as an electronic controller 20 (e.g., an electronic processor or a microprocessor), at least one user input device (e.g., a mouse, a keyboard, a trackball, a finger swipe on a touchscreen of a smart device, and/or the like) 22, and at least one display device 24 (shown only in FIG. 1, e.g., an LCD display, plasma display, cathode ray tube display, and/or so forth). In some embodiments, the display device 24 can be a separate component from the electronic processing device 18. The display device 24 may also comprise two or more display devices.

The electronic controller 20 is operatively connected with a one or more non-transitory storage media 26. The non-transitory storage media 26 may, by way of non-limiting illustrative example, include one or more of a magnetic disk, RAID, or other magnetic storage medium; a solid state drive, flash drive, electronically erasable read-only memory (EEROM) or other electronic memory; an optical disk or other optical storage; various combinations thereof; or so forth; and may be for example a network storage, an internal hard drive of the ventilation assistance device 18, various combinations thereof, or so forth. It is to be understood that any reference to a non-transitory medium or media 26 herein is to be broadly construed as encompassing a single medium or multiple media of the same or different types. Likewise, the electronic controller 20 may be embodied as a single electronic processor or as two or more electronic processors. The non-transitory storage media 26 stores instructions executable by the at least one electronic controller 20. The instructions include instructions to generate a graphical user interface (GUI) 28 for display on the remote operator display device 24.

Furthermore, as disclosed herein, the non-transitory storage media 26 stores instructions executable by the at least one electronic controller 20 to perform a ventilation assistance method or process 100 to provide ventilation therapy to the patient P.

It will be appreciated that, as previously noted, the mechanical ventilator 2 (can be disposed in a first room of a medical facility, while the image acquisition device 15 and the electronic processing device 18 can be disposed in a second, different room of the medical facility. This is depicted by the dashed line L in the generally "middle" portion of FIG. 1. In another example, the mechanical ventilator 2 and the electronic processing device 18 can be disposed in the first room, while the image acquisition device 15 is disposed in the second room of the medical facility. In a further example, each of the mechanical ventilator 2, the image acquisition device 15 and the electronic processing device 18 can be disposed in separate rooms of the medical facility. Additionally or alternatively, a bedside imaging device 15B may be provided in the patient's room. These are merely illustrative examples.

As described herein, the method 100 can be performed by the electronic processing device 18, or can be performed by the electronic controller 13 of the mechanical ventilator 2.

Figure 2:
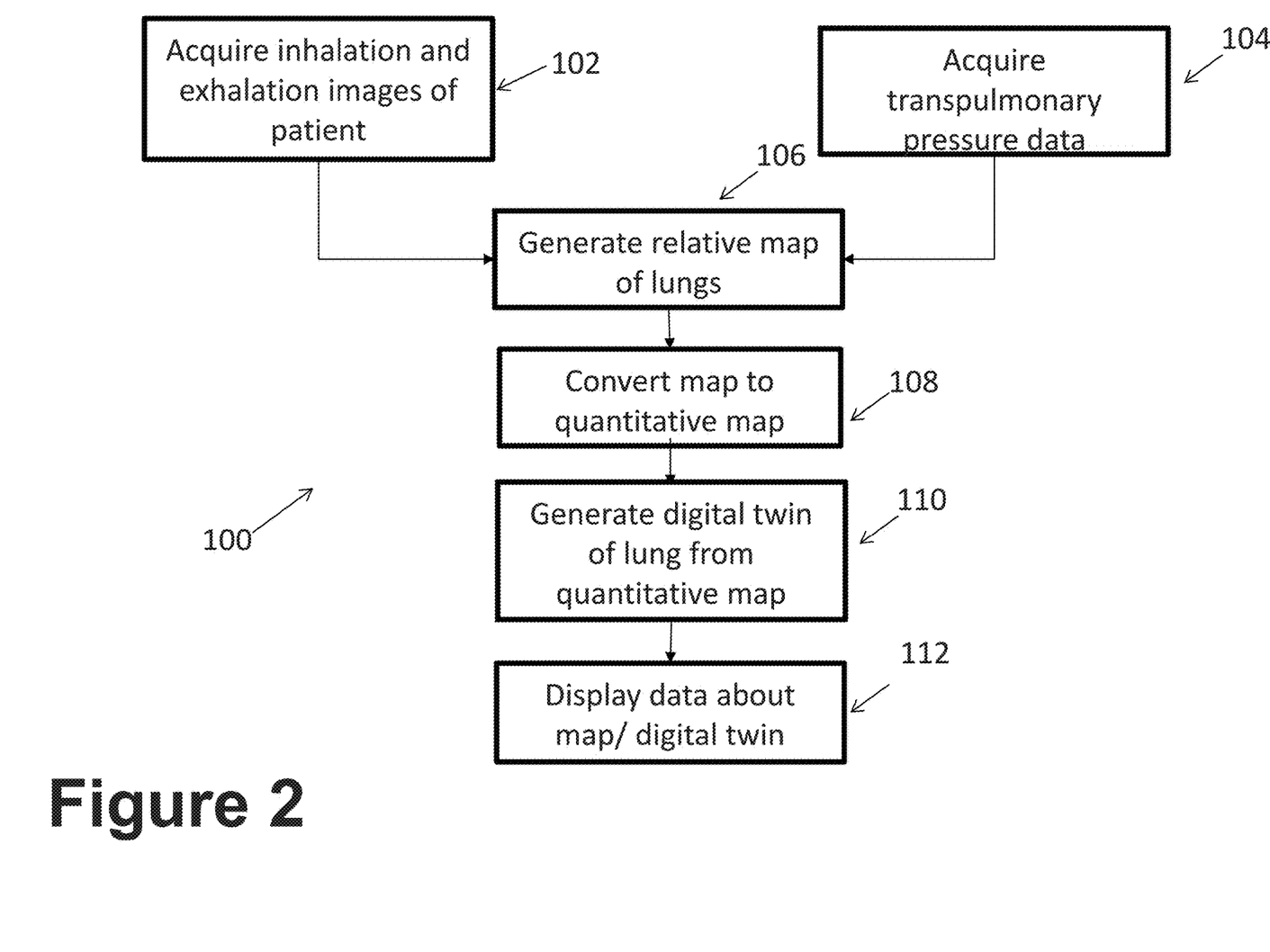
FIG. 2 shows an example flow chart of operations suitably performed by the system of FIG. 1.

With reference to FIG. 2, and with continuing reference to FIG. 1, an illustrative embodiment of the ventilation assistance method 100 is diagrammatically shown as a flowchart. At an operation 102, one or more images 34 of the patient are obtained by the medical imaging device 15. In a particular example, the acquired images 34 are CT images 34. To acquire the CT images 34, the electronic controller 20 is configured to control the medical imaging device 15 (i.e., a CT scanner) to acquire the CT images 34 of the upper airway or respiratory tract (e.g., from the nose or the mouth to the carina) of the patient P.

The imaging operation 102 includes analyzing the images 34 to determine an inhalation image 35 acquired during an inhalation phase of the mechanical ventilation therapy, and an exhalation image 36 acquired during an exhalation phase of the mechanical ventilation therapy. For example, the inhalation image 35 can be acquired at a maximum inhalation by the patient P, and the exhalation image 36 can be acquired at a maximum exhalation by the patient P. Transpulmonary pressure data associated with lungs of a patient P is also measured in an operation 104 performed concurrently with the imaging operation 102. The transpulmonary pressure data can include, for example, an inhale transpulmonary pressure, such as a transpulmonary pressure reading measured at the time of acquisition of the inhalation image 35, and an exhale transpulmonary pressure, such as another transpulmonary pressure reading measured at the time of acquisition of the exhalation image 36.

In some embodiments, the imaging operation 102 can include receiving airway airflow as a function of time during the mechanical ventilation therapy, and the inhalation image 35 and the exhalation image 36 are selected as images of the imaging data acquired at times when the airway airflow is zero. The transpulmonary pressure can then be simultaneously measured in the operation 104 (e.g., with an esophageal catheter having a pressure sensor, or using a method described in, for example, Umbrello, M. and Chiumello, D., 2018, "Interpretation of the transpulmonary pressure in the critically ill patient", Ann Transl. Med 2018; 6(19):383).

Figure 3:
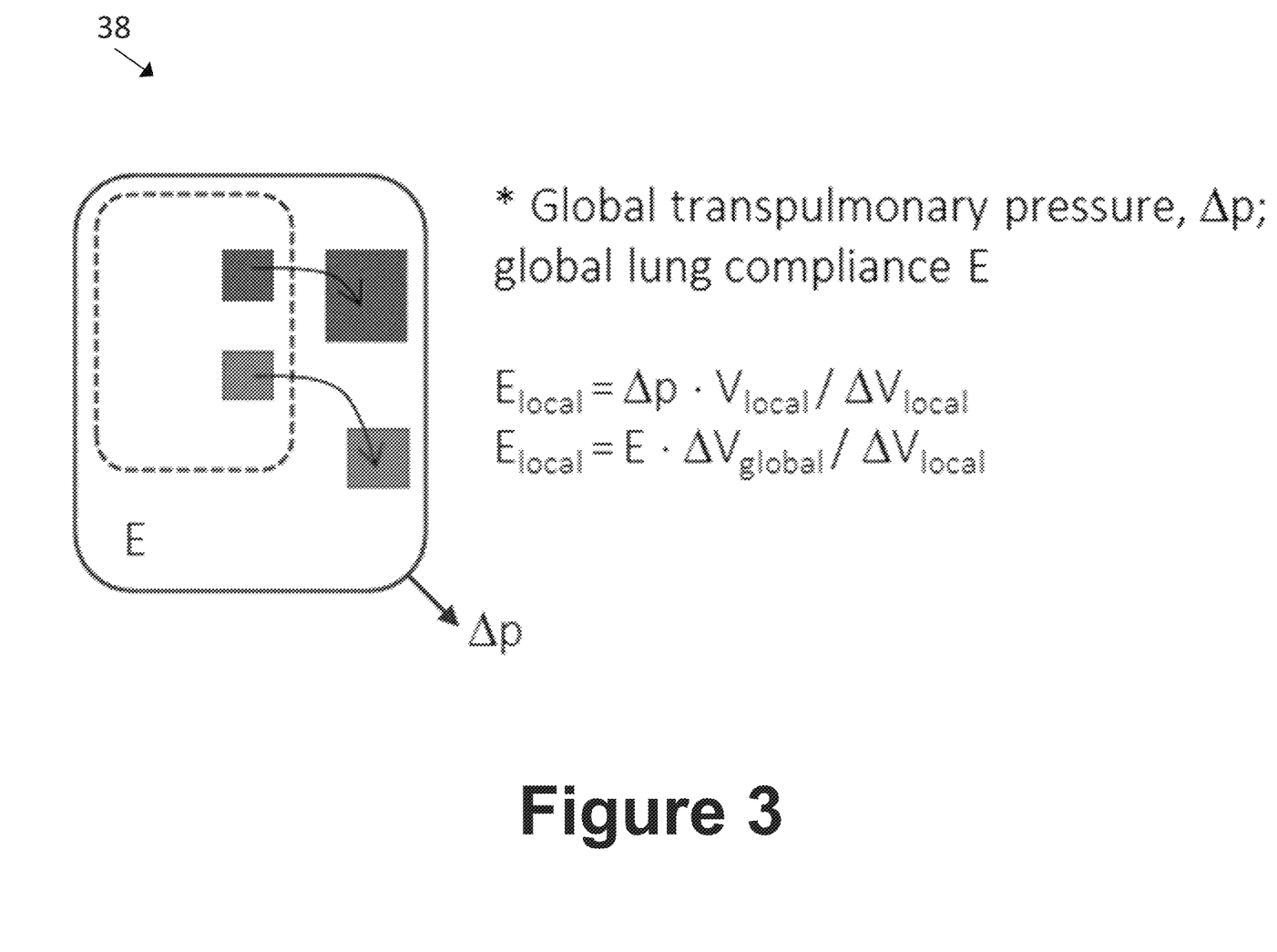
FIGS. 3 and 4 show examples of maps generated by the system of FIG. 1.

At an operation 106, a deformable image registration (DIR) of the inhalation image 35 and the exhalation image 36 is performed to produce a relative compliance or elasticity map 38 of the lungs. The volumetric strain on individual lung tissues is determined from the DIR operation 106, and along with the global pressure exerted on the individual lung tissues from the mechanical ventilator 2 (from the operation 104), a stiffness value of the individual lung tissues can be determined in the relative compliance or elasticity map 38. In one example, for elastic deformation, the elastic modulus equals $E_{local} = \Delta p \cdot V_{local}/\Delta V_{local}$. Alternatively, the compliance map or elasticity map 38 can be calibrated by scaling the local deformation with the global lung deformation and taking the global lung compliance C, or elasticity E, from the mechanical ventilator as a reference: $E_{local}/E = \Delta V_{global}/\Delta V_{local}$. FIG. 3 shows an example of the relative compliance or elasticity map 38 using a global pressure $\Delta p$.

In another embodiment, the operation 106 can be performed using DIR with X-ray or CT, a similar deformation map can be obtained directly from electrical impedance tomography (EIT) at a bedside of the patient P. The advantage is that the compliance map or elasticity map 38 can be continuously updated, since EIT is a wearable technology. Similarly, the bedside imaging device 15B could be used in the operation 102 to acquire the inhalation and exhalation images. This would enable more frequent updates to the digital twin as the bedside imaging typically can be performed more frequently.

At an operation 108, the relative compliance or elasticity map 38 of the lungs is converted to a quantitative compliance or elasticity map 39 of the lungs based on the inhale transpulmonary pressure and the exhale transpulmonary pressure (obtained from the operation 104). Transpulmonary pressure is the difference between the alveolar pressure and the intrapleural pressure in the pleural cavity. Hence, the transpulmonary pressure is the actual pressure inducing deformation of lung tissue, so that using transpulmonary pressure as disclosed herein enables operation 108 to convert the relative compliance or elasticity map 38 to the quantitative compliance or elasticity map 39. In some examples, the conversion operation 108 can be performed using an airway tree 40 of the lungs of the patient P. The airway tree 40 advantageously can be a patient-specific airway tree extracted from one or more images 34 acquired at the operation 102.

Figure 4:
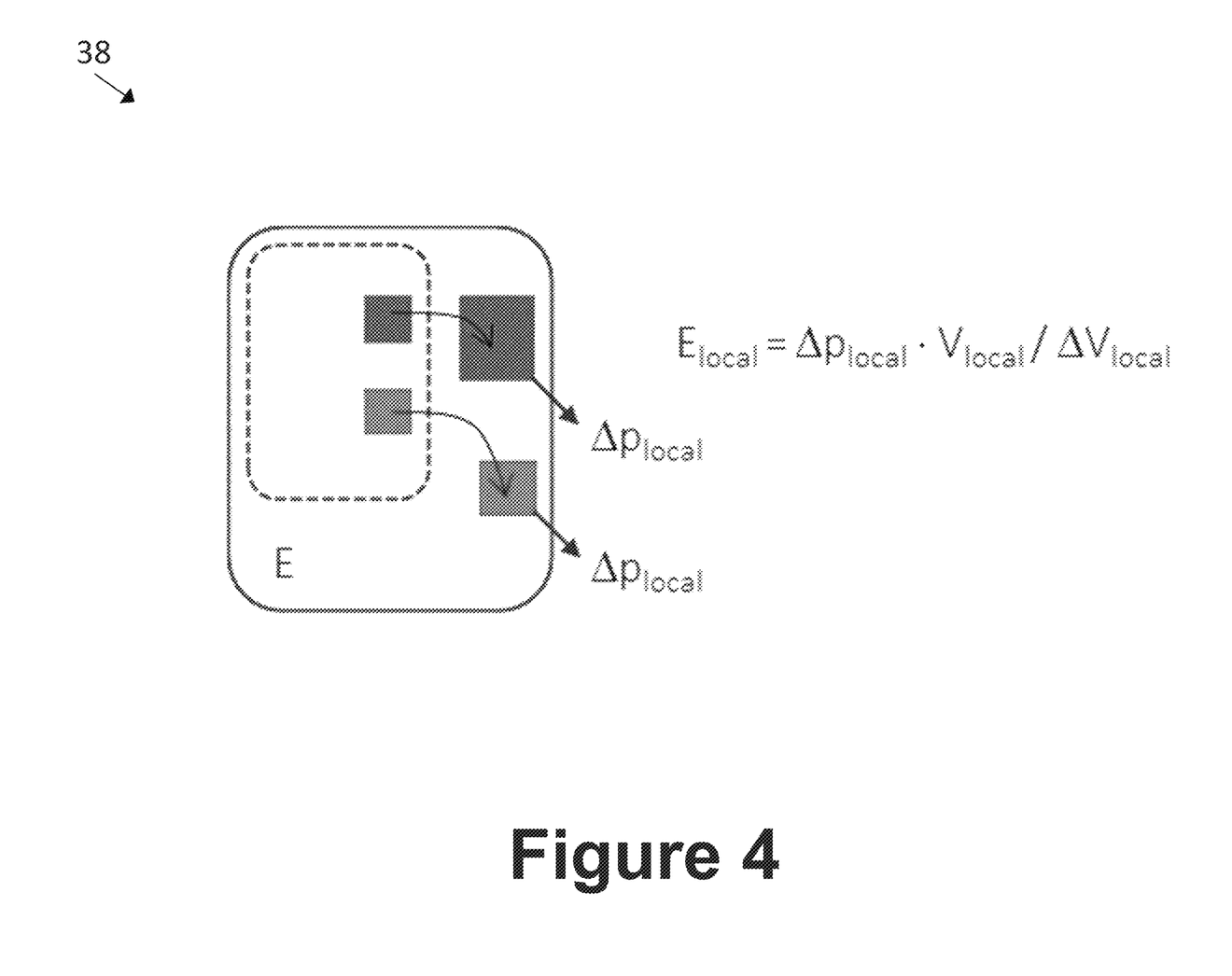

The airway tree 40 can be a one-dimensional (1D) airflow model showing local resistances of the individual lung tissues in the different airway generations. Patient specific parameters of airway tree 40 can be obtained from a segmented 3D-CT scan (e.g., distribution, length, and diameter of the airway generations), for example acquired in the operation 102. Alternatively, when a CT scan is not available (for example, if the imaging 102 was performed using an imaging modality that does not effectively image the airway tree 40), a generic bronchial tree network with some airway generations can be used. Optionally, the local resistances of the individual lung tissues can be calibrated with a measured global lung resistance. When the local pressure distribution in the airway tree 40 is known, the local elasticity can be estimated using the local pressure $\Delta p_{local}$ instead of the global pressure $\Delta p$. FIG. 4 shows an example of the relative compliance or elasticity map 38 generated using the local pressure $\Delta p_{local}$.

At an operation 110, a digital twin 42 of the lungs of the patient P can be generated by modeling stress and strain distributions in the lungs of the patient represented by the quantitative compliance or elasticity map 39 of the lungs in response to the mechanical ventilation therapy. A "digital twin" of the lungs as used herein refers to a virtual representation of the physical lungs. Using computational modeling, the digital twin 42 of the lungs of the patient P simulates physiological processes using sensor data and other information which is continuously acquired from the lungs. The digital twin 42 can be continuously updated to evaluate functioning of the lungs of the patient P to reflect a status of the patient P (i.e., lung function, disease progression, and so forth) and future predictions for the patient P (i.e., optimizing settings of the mechanical ventilator 2) to provide best possible outcomes (i.e., quicker patient recovery with minimal damage). To do so, updated imaging data (i.e., additional images 34) can be received and used to update the digital twin 42.

Figure 5:
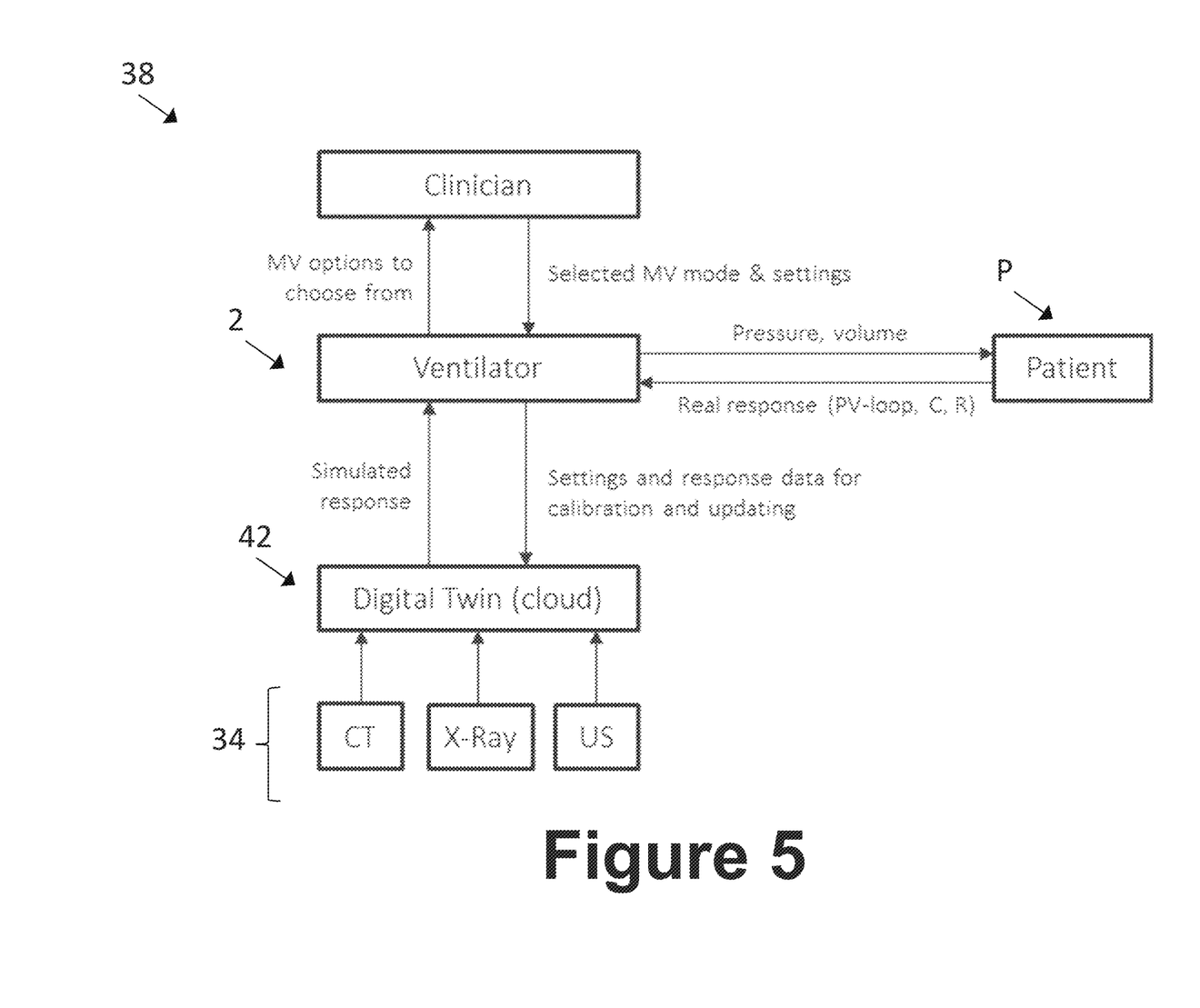
FIG. 5 diagrammatically shows an example of a digital twin generated by the system of FIG. 1.

FIG. 5 diagrammatically shows an example of the digital twin 42 and ancillary components. The digital twin 42 can be generated from the images 34 acquired in the operation 102 (e.g., via CT, X-Ray, or ultrasound (US)) and the corresponding transpulmonary pressure readings acquired in the operation 104, and the digital twin 42 can be stored in the cloud or the non-transitory computer readable medium 26 of the electronic processing device 18. The digital twin 42 can be retrieved, and used by, the clinician via the mechanical ventilator 2 to simulate different mechanical ventilator settings on the digital twin 42. Based on the simulations, the clinician can adjust settings of the mechanical ventilator 2 to treat the patient P.

Figure 6:
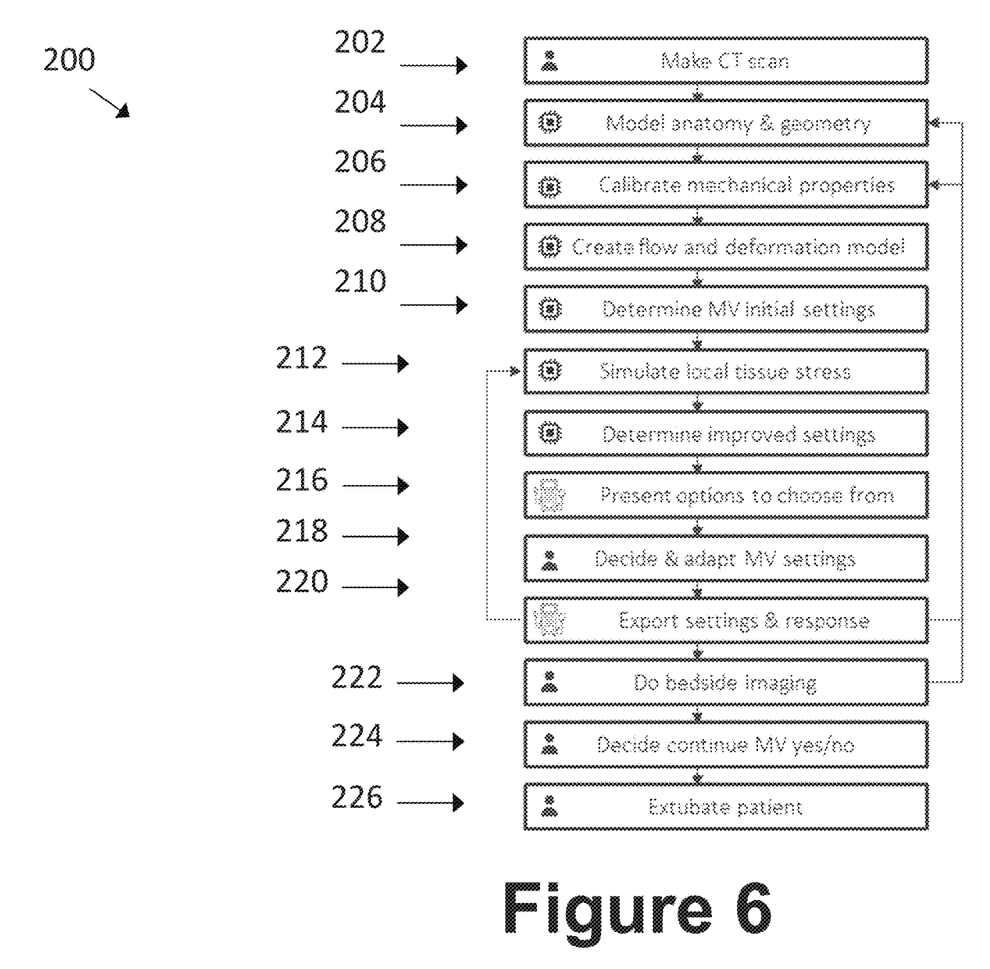
FIG. 6 shows an example flow chart of operations to generate the digital twin shown in FIG. 5.

With reference to FIG. 6, and with continuing reference to FIGS. 1 and 5, an illustrative embodiment of a digital twin generation and use method 200 is diagrammatically shown as a flowchart. At an operation 202, one or more CT images 34 are generated with the image acquisition device 15. At an operation 204, the electronic processing device 18 is configured to generate a model of the anatomy and geometry of the lungs of the patient P from the images 34. At an operation 206, mechanical properties of the model are calibrated using local mechanical properties of the tissues of the lungs using the quantitative compliance or elasticity map 39 of the lungs to generate the digital twin 42. At an operation 208, a computational fluid dynamics and a computational mechanics process is applied to create a flow and deformation model of the lungs. At an operation 210, mechanical ventilator initial settings are determined (using known protocol(s) accepted in the medical community). At an operation 212, a local tissue stress simulation is performed on the digital twin 42 to simulate effects on the lung (e.g., tissue stress and strain) at the different ventilation settings (e.g., flow, volume, pressure, rise time etc.). From this, at an operation 214, updated mechanical ventilator settings are determined by an algorithm (or optionally by the clinician). For example, the tidal volume or pressure can be decreased by a prescribed amount to lower a local lung strain or stress such that the values do not exceed a predetermined threshold. At an operation 216, one or more setting options, including a resulting lung stress, are displayed on the display device 14 of the mechanical ventilator 2. At an operation 218, a clinician selects one or more of the displayed setting options, which are then used by the mechanical ventilator 2. At an operation 220, results of the mechanical ventilation therapy using the selected setting options are displayed on the display device 14 of the mechanical ventilator 2 (at which points one or more of the operations 204, 206, and/or 212 can be repeated, as shown by the arrows in FIG. 6). At an operation 222, beside imaging (e.g., EIT imaging, or X-ray imaging) of the patient P can be performed, and the imaging data can be further used to update the digital twin 42, at which point the operation 204 can be repeated. At an operation 224, the clinician can decide whether to continue with mechanical ventilation therapy, and if yes, at an operation 226, the patient P can be extubated (e.g., by removing the ETT 16).

Referring back to FIGS. 1 and 2, at an operation 112, the mechanical ventilator 2 can be controlled to adjust one or more parameters of the mechanical ventilation therapy delivered to the patient P using the digital twin 42.

At an operation 112, information relating to or derived from the quantitative compliance or elasticity map 39 and/or the digital twin 42 can be displayed on the display device 14 of the mechanical ventilator 2. In one embodiment, a graphical representation of the digital twin 42 can be displayed on the display device 14. The representation of the digital twin 42 can include clinical decision support (CDS) information and to show this information on the display device 14 of the mechanical ventilator 2 such that the clinician can quickly and easily choose or decide on the best mechanical ventilation therapy scenario. For example, the digital twin 42 can be displayed and include selectable options for proceeding with mechanical ventilation therapy on a situational need, a patient care path, and an expertise of the clinician.

Depending on the patient care path, clinicians might need different types of information and support with respect to the prevention of VILI in mechanical ventilation which can be displayed on the display device 14, including options (1), diagnostic data and information on lung heterogeneity (e.g. compress the information from a functional respiratory image (FRI) into a single metric); option (2) outcome predictions (i.e., the mechanical ventilator mode which provides the shortest stay possible, or to early select other therapy options when mechanical ventilation fails); option (3) therapy planning support (e.g. simulate MV parameters and output lung tissue stress); or option (4) monitoring information to execute and maintain safe mechanical ventilation, and recommendations to adapt the mechanical ventilation settings when necessary.

Depending on the situation, such as whether the clinician has sufficient time or is in a hurry, whether the clinician is in a planned routine visit or an emergency, the nature of the information or the required action of the system might be different. Different options can then be displayed on the display device 14, including option (A) when there is sufficient time or there is a planned routine visit: "show what is happening now, or what will happen after therapy adaptation"; option (B) when there is limited time, the patient P needs help now, or it is an emergency, "provide a recommendation, or a few scenarios to choose from; or option (C) when there is no time, or the clinician is not present "automate tasks."

Depending on the expertise of the clinician, different options can then be displayed on the display device 14, including option (i) pulmonologist; or option (ii) nurse.

A lookup table 44 implemented in the electronic processor 13 of the mechanical ventilator 2 can be used to determine which options are displayed on the display device 14. For example, the lookup table 44 can receive, as inputs, hospital department agenda, mechanical ventilator sensor data, and environmental sensor data. From these inputs, the lookup table 44 can select which of the options (e.g., options 1-4, A-C, or i-ii) can be displayed on the display device 14. For example, for situation aspects, if the hospital department agenda indicates a planned routine visit, the lookup table 44 can select option A to be displayed for selection. If the hospital department agenda indicates there is no routine visit and there is an alarm, the lookup table 44 can select option B to be displayed for selection. If there is no caregiver present (e.g., determined from presence detector, camera, microphone, badge reader activity etc.), the lookup table 44 can select option C to be displayed for selection.

For expertise aspects, if the presence of a caregiver is detected (e.g., by an activated facial or a voice recognition, or another automatic identification technique like information from badge reader etc.), the expertise level (e.g., pulmonologist or nurse) is imported from the non-transitory computer readable medium 26, and the lookup table 44 can select either option (i) or (ii) for display.

For patient care path aspects, the care path phase of the patient can be registered in an emergency room information system, an electronic medical record (EMR) database, or another hospital department information system. For example, if the patient P is diagnosed with severe COVID-19 and is admitted to the ICU, the lookup table 44 can select option 3 for display. In another example, if the patient P is ventilated in the ICU for a week, and the condition is deteriorating, then the lookup table 44 can select option 4 for display.

In some embodiments, multiple types of options can be displayed (for example, options 1, A, and i can be displayed, options 3, B, and ii can be displayed, and so forth). In other embodiments, a push button can be pressed on the display device 14 to show a standard or blank user interface (UI), or the button can be pushed to show the options selected by the look up table 44.

In some embodiments, the displaying operation 112 can include displaying a graph 46 on the display device 14 showing settings of the mechanical ventilator 2 relative to a strain on the lungs. In one example, the graph 46 can be a bar graph showing tidal volume of the lungs and strain on the lungs. The bar graph 46 can include two columns representing the left and right lung, along with a tidal volume slider. A percentage of the lungs that exceed a critical strain (e.g., e>2) can also be displayed. The bars can also be color-coded. For example, a "green" bar can indicate that 0% of the lungs is overloaded (i.e., strained). A "red" bar can indicate that one of the lobes of the lung is overstrained above a threshold (e.g., 30% strain).

In other examples, the graph 46 can be a line graph. The line graph 46 can show a percentage of the lungs that exceed a critical strain (e.g., e>2) as a function of the mechanical ventilation settings. In some examples, the critical strain e can be patient-specific based on damage to the lungs shown in the images 34 (e.g., from emphysema or fibrosis). In other examples the graph 46 can show an impact of changes to the mechanical ventilation settings on anticipated outcomes based on a patient similarity analysis performed by the electronic controller 13 of the mechanical ventilator 2 (or the electronic controller 20 of the electronic processing device 18). The similarity analysis uses, as inputs, longitudinal mechanical ventilation settings and mechanical ventilation sensor data, diagnostic scans, bedside imaging, patient characteristics and reported outcomes. For example, an icon with green, amber, and red zones indicates the predicted patient stay (in days) as a function of the mechanical ventilation settings. For example, from similar Covid-19 patients, it appears that it is too late for invasive mechanical ventilation because too much fibrosis has developed.

In other examples, the line graphs 46 can also include a lung tissue stress value or a volume distribution in real-time during a breath cycle of the patient P (e.g., based on events that happen if a breath is made shorter). The line graph 46 can also show other data, including a range of compliances or elasticities present in the lungs, a ratio of biomechanical metrics (volumes, elasticity, etc.) in each lung, and so forth.

Figure 7:
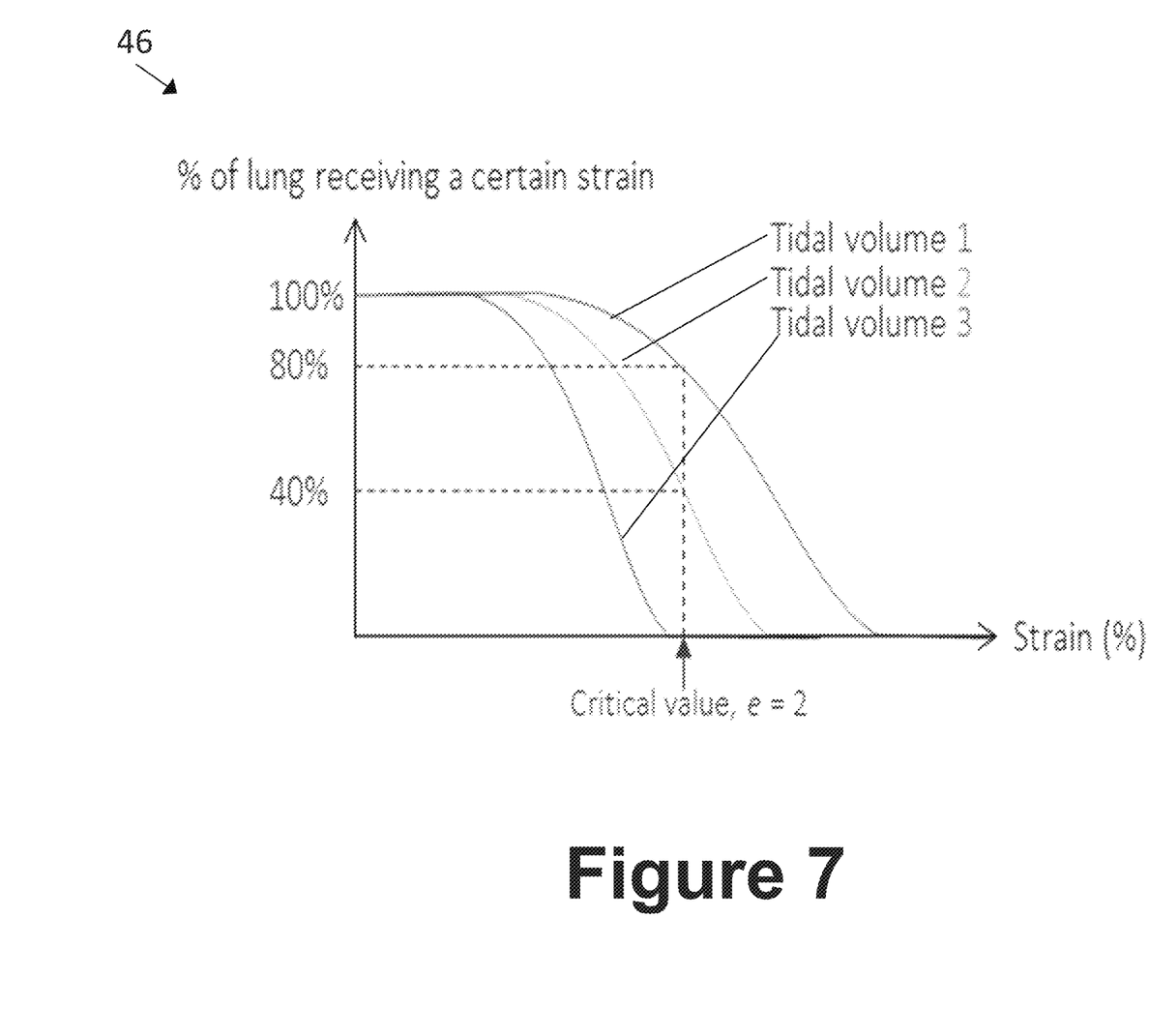
FIG. 7 shows an example graph generated by the system of FIG. 1.

FIG. 7 shows an example of a line graph 46 displayed on the display device 14. As shown in FIG. 7, three lines representing different tidal volumes of the lungs are plotted as a percentage of the lung receiving a certain strain value versus a strain percentage on the lungs. The lines representing tidal volumes 1 and 2 are shown to have met or exceeded a critical strain value (e.g., e=2), in which case an alert 48 (see FIG. 1) can be output to the clinician (i.e., as a message on the display device 14 or as an audio tone).

In some examples, although not shown in FIG. 7, the different lines can be color-coded based on a criticality level of the patient P. For example, tidal volume line 1 can be color-coded red (indicating a high strain on the lungs, and thus requiring attention of the clinician), tidal volume line 2 can be color-coded yellow (indicating a moderately high strain on the lungs, and thus possibly requiring attention of the clinician), and tidal volume line 3 can be color-coded green (indicating a low strain on the lungs that does not exceed the critical value, and thus not requiring attention of the clinician).

In other embodiments, the clinician can select a portion of the graph 46 on the display device (e.g., with a finger-tap or swipe indicating a user input). Based on the portion of the graph 46 where the user input was received, additional information related to that portion of the graph 46 can be displayed on the display device 14. For example, if the clinician selects tidal volume line 2, the exact strain value (distribution) can be displayed for that tidal volume, and the clinician can decide whether to adjust the settings of the mechanical ventilator 2.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A mechanical ventilation device comprising at least one electronic controller configured to:
   receive imaging data and transpulmonary pressure data associated with a lung of a patient while the patient undergoes mechanical ventilation therapy with a mechanical ventilator, wherein the imaging data includes:
      an inhalation image acquired during an inhalation phase of the mechanical ventilation therapy; and
      an exhalation image acquired during an exhalation phase of the mechanical ventilation therapy; and
   the transpulmonary pressure data includes:
      an inhale transpulmonary pressure at a time of acquisition of the inhalation image; and
      an exhale transpulmonary pressure at a time of acquisition of the exhalation image;
   perform deformable image registration of the inhalation image and the exhalation image to produce a relative compliance or elasticity map of the lungs;
   convert the relative compliance or elasticity map of the lungs to a quantitative compliance or elasticity map of the lungs based on the inhale transpulmonary pressure and the exhale transpulmonary pressure;
   display information relating to or derived from the quantitative compliance or elasticity map on a display device generate a digital twin of the lungs of the patient by modeling stress and strain distributions in the lungs of the patient represented by the quantitative compliance or elasticity map of the lungs in response to the mechanical ventilation therapy; and
   control the mechanical ventilator to adjust one or more parameters of the mechanical ventilation therapy delivered to the patient using the digital twin.

2. The device of claim 1, wherein the at least one electronic controller is further configured to:
   receive airway airflow as a function of time during the mechanical ventilation therapy; and
   select the inhalation image and the exhalation image as images of the imaging data acquired at times when the airway airflow is zero.

3. The device of claim 1, wherein the at least one electronic controller is configured to:
   convert the relative compliance or elasticity map of the lungs to the quantitative compliance or elasticity map of the lungs further based on an airway tree of the lungs of the patient.

4. The device of claim 3, wherein the at least one electronic controller is configured to:
   generate the airway tree of the lungs of the patient by extracting the airway tree of the lungs of the patient from at least one image of the imaging data.

5. The device of claim 1, wherein the at least one electronic controller is programmed to:
   receive updated imaging data; and
   update the digital twin with the updated imaging data.

6. The device of claim 1, wherein the mechanical ventilator is configured to deliver the mechanical ventilation therapy to the patient.

7. The device of claim 1, wherein the displayed information relating to or derived from the quantitative compliance or elasticity map comprises:
   a graphical representation of the digital twin.

8. The device of claim 1, further comprising:
   an imaging device configured to acquire the imaging data.

9. The device of claim 8, wherein the imaging device is a computed tomography (CT) imaging device.

10. The device of claim 1, wherein the at least one electronic controller is programmed to:
    display, on the display device of the mechanical ventilator, a graph showing settings of the mechanical ventilator relative to a strain on the lungs.

11. The device of claim 10, wherein the at least one electronic controller is programmed to:
    receive a user input from a user on the display device on a portion of the displayed graph; and display additional information related to the portion of the graph where the user input was received.

12. The device of claim 10, wherein the at least one electronic controller is programmed to:
color-code lines on the graph related to the settings of the mechanical ventilator based on a criticality level of the patient.

13. The device of claim 12, wherein the at least one electronic controller is programmed to:
output an alert when a critical strain value on the lungs occurs.

14. A mechanical ventilation method comprising, with at least one electronic controller:
receiving imaging data and transpulmonary pressure data associated with lungs of a patient while the patient undergoes mechanical ventilation therapy with a mechanical ventilator, wherein the imaging data includes:
an inhalation image acquired during an inhalation phase of the mechanical ventilation therapy; and
an exhalation image acquired during an exhalation phase of the mechanical ventilation therapy; and
the transpulmonary pressure data includes:
an inhale transpulmonary pressure at a time of acquisition of the inhalation image; and
an exhale transpulmonary pressure at a time of acquisition of the exhalation image;
performing deformable image registration of the inhalation image and the exhalation image to produce a relative compliance or elasticity map of the lungs;
converting the relative compliance or elasticity map of the lungs to a quantitative compliance or elasticity map of the lungs based on the inhale transpulmonary pressure and the exhale transpulmonary pressure;
displaying information relating to or derived from the quantitative compliance or elasticity map on a display device generating a digital twin of the lungs of the patient by modeling stress and strain distributions in the lungs of the patient represented by the quantitative compliance or elasticity map of the lungs in response to the mechanical ventilation therapy; and
controlling the mechanical ventilator to adjust one or more parameters of the mechanical ventilation therapy delivered to the patient using the digital twin.

* * * * *